(12) United States Patent
Stanifer et al.

(10) Patent No.: US 8,602,438 B2
(45) Date of Patent: Dec. 10, 2013

(54) FIFTH WHEEL HITCH SKID PLATE COVER

(75) Inventors: Eric J. Stanifer, Mishawaka, IN (US); Richard W. McCoy, Granger, IN (US)

(73) Assignee: Cequent Performance Products, Inc., Plymouth, MI (US)

( * ) Notice: Subject to any disclaimer, the term of this patent is extended or adjusted under 35 U.S.C. 154(b) by 128 days.

(21) Appl. No.: 13/191,009

(22) Filed: Jul. 26, 2011

(65) Prior Publication Data

US 2012/0018977 A1     Jan. 26, 2012

Related U.S. Application Data

(60) Provisional application No. 61/367,685, filed on Jul. 26, 2010.

(51) Int. Cl.
*B62D 53/08* (2006.01)

(52) U.S. Cl.
USPC ........................................ 280/433; 280/438.1

(58) Field of Classification Search
USPC ................................ 280/433, 438.1; 384/421
See application file for complete search history.

(56) References Cited

U.S. PATENT DOCUMENTS

| | | | |
|---|---|---|---|
| 3,704,924 A * | 12/1972 | Lowry | ........................... 384/421 |
| 4,169,635 A | 10/1979 | Szalay et al. | |
| 4,721,323 A | 1/1988 | Czuk et al. | |
| 5,165,713 A | 11/1992 | Picard | |
| 5,431,424 A * | 7/1995 | Colwell | ........................ 280/433 |
| 5,509,682 A | 4/1996 | Lindenman et al. | |
| 5,516,137 A | 5/1996 | Kass et al. | |
| 5,529,329 A | 6/1996 | McCoy | |
| D378,077 S | 2/1997 | Lindenman et al. | |
| D380,719 S | 7/1997 | Lindenman et al. | |
| 5,707,070 A | 1/1998 | Lindenman et al. | |
| D395,025 S | 6/1998 | Lindenman et al. | |
| 6,010,141 A * | 1/2000 | Huntimer et al. | ............. 280/433 |
| D423,998 S | 5/2000 | Lindenman et al. | |
| 6,170,851 B1 | 1/2001 | Lindenman et al. | |
| 6,371,504 B1 * | 4/2002 | Alguera Gallego et al. | .. 280/433 |
| 6,398,249 B1 | 6/2002 | Lindenman et al. | |
| 6,554,310 B2 | 4/2003 | Babin | |
| 6,682,089 B2 | 1/2004 | McCoy et al. | |
| 6,685,210 B2 | 2/2004 | Lindenman et al. | |
| D488,412 S | 4/2004 | Lindenman et al. | |
| D495,279 S | 8/2004 | Lindenman et al. | |
| D500,715 S | 1/2005 | Lindenman et al. | |
| 6,942,236 B2 | 9/2005 | Lindenman et al. | |
| 7,036,839 B2 * | 5/2006 | Hungerink et al. | ........... 280/433 |
| 7,121,573 B2 | 10/2006 | Lindenman et al. | |
| 7,261,311 B2 | 8/2007 | Lindenman et al. | |
| 7,264,259 B2 | 9/2007 | Lindenman et al. | |
| 7,547,034 B2 * | 6/2009 | Hungerink et al. | ........... 280/433 |
| 7,556,278 B2 | 7/2009 | Roberts et al. | |
| 7,654,552 B2 | 2/2010 | Hoopes et al. | |
| 7,879,273 B2 * | 2/2011 | Hungerink et al. | ........... 264/241 |

(Continued)

OTHER PUBLICATIONS

European Search Report (EP 2 412 616), Feb. 1, 2012, Cequent Performance Products, Inc.

*Primary Examiner* — Kevin Hurley
(74) *Attorney, Agent, or Firm* — McDonald Hopkins LLC (57) ABSTRACT

A fifth wheel hitch may include a skid plate having a plurality of recesses, and a skid plate cover secured to the skid plate. The skid plate cover may also include a plurality of projections, where the projections engage with the recesses of the skid plate.

20 Claims, 6 Drawing Sheets

(56) References Cited

U.S. PATENT DOCUMENTS

| | | |
|---|---|---|
| 2004/0021290 A1 | 2/2004 | Hicks et al. |
| 2009/0127823 A1 | 5/2009 | Colibert-Clarke et al. |
| 2010/0237587 A1 | 9/2010 | McCoy et al. |
| 2012/0018977 A1 | 1/2012 | Stanifer et al. |
| 2012/0018978 A1 | 1/2012 | McCoy et al. |

* cited by examiner

FIFTH WHEEL HITCH SKID PLATE COVER

CROSS-REFERENCE TO RELATED APPLICATION

This application claims benefit from U.S. Provisional Patent Application No. 61/367,685, entitled "Fifth Wheel Hitch Skid Plate Cover," filed on Jul. 26, 2010, which is hereby incorporated in its entirety by reference.

TECHNICAL FIELD

The present invention generally relates to a fifth wheel hitch and, more particularly, to a molded fifth wheel hitch skid plate cover.

BACKGROUND

The towing industry has developed a number of methods and apparatuses for securing a towed vehicle or trailer to a towing vehicle. For example, hitch balls have been developed to be attached to the bumper or other rear portion of a towing vehicle. A trailer or towed vehicle equipped with a coupler mechanism may be attached to the towing vehicle by placing the coupling mechanism over the hitch ball and securing the coupler to the ball. Similar apparatus using hitch receivers attached to the rear of a towing vehicle and drawbars may be used to secure trailers to towing vehicles.

Some trailers may be designed to carry heavy loads. Connecting such a trailer to a ball hitch on a bumper of a towing vehicle, however, may be impractical. When a trailer load is heavy when compared to the weight of the towing vehicle, applying the trailer load to the rear of the towing vehicle may cause undesirable towing conditions. In such situations, the trailer may often be secured to a load bed of a towing vehicle, whereby the force of the trailer load is generally applied over or near the rear axle of the towing vehicle to create a potentially more stable towing condition. In addition, such an arrangement may put much of the force of the trailer load onto structural members of the towing vehicle, such as the frame.

There are generally two arrangements for securing a trailer to the load bed of a towing vehicle—a fifth wheel hitch and a gooseneck hitch. A gooseneck hitch is generally attached to a hitch ball that may be located in the load bed of the towing vehicle. The hitch ball may typically be secured to the frame or load bed of the towing vehicle. A fifth wheel hitch may generally be positioned in a load bed of the towing vehicle and secured either to the load bed or directly to the frame of the towing vehicle. Fifth wheel hitches may generally be attached to the load bed or frame whereby tools may generally be required to remove fasteners and other connectors to install or uninstall a fifth wheel hitch to the load bed of a towing vehicle.

Typically, a fifth wheel trailer may include a king pin that may be used to couple the trailer to the towing vehicle. Fifth wheel trailers are commonly coupled to towing vehicles that include a load bed, such as a pick-up truck or a flatbed truck. A fifth wheel hitch assembly may be secured in the load bed of the towing vehicle, whereby the king pin of the trailer is commonly coupled to the fifth wheel hitch assembly.

Fifth wheel hitch assemblies may typically include a support frame for securing the hitch assembly to the load bed of the towing vehicle. The support frame may include a pair of mounting rails, a pair of side brackets, and a head assembly. The mounting rails may be bolted to the load bed or the frame of the towing vehicle. The side brackets may be secured to the mounting rails and the head assembly may be secured to the side brackets. The head assembly may be secured in a manner that allows the head assembly to pivot fore-and-aft with respect to the towing vehicle.

The head assembly may include a jaw assembly for securing the king pin of the trailer to the towing vehicle. The jaws may be moveable to secure and release the king pin extending from the trailer. The jaws may also be arranged such that an operator may manually toggle the jaws between a position in which the king pin is secured in the jaws and a position in which the king pin is released from the jaws. When the king pin is secured in the jaws, the trailer is secured to the towing vehicle and may be towed by the towing vehicle. When the king pin is released from the jaws, the king pin may be removed from the jaws, decoupling the trailer from the towing vehicle.

Fifth wheel hitches may normally be arranged such that the king pin is aligned over or near the rear axle and approximately equidistant between the rear wheels of the towing vehicle. Fifth wheel hitches may provide releasably engaged bearing surfaces, such as one being mouthed on a rear portion of the truck and the other being mounted on the underside of a forward portion of the trailer. This bearing surface of the truck may support the weight of the trailer resting against it and may act as a surface against which the bearing surface of the trailer rotates as necessary during towing operations.

Lubrication of these engaged bearing surfaces is often provided by the application of a lubricant, such as grease, to the bearing surface of the truck. However, due to long hours of use and the rapid dissipation of lubricant, frequent reapplication of the lubricant may be required while premature wear of the load bearing surfaces may still result.

Another option may be to utilize a cover on a skid plate of the fifth wheel hitch assembly. Typically, skid plate covers are a universal application that relies on two flat surfaces that mate to one another. These types of covers, however, may be relatively complex, expensive and difficult to install.

SUMMARY

A fifth wheel hitch may include a skid plate having a plurality of recesses, and a skid plate cover secured to the skid plate. The skid plate cover may also include a plurality of projections, where the projections engage with the recesses of the skid plate.

In another embodiment, a fifth wheel hitch assembly may include a skid plate, a skid plate cover engaged with the skid plate, and at least one anti-rotation member positioned on at least one of the skid plate and the skid plate cover, where the anti-rotation member substantially prevents rotation of the skid plate cover relative to the skid plate.

In yet another embodiment, a fifth wheel hitch assembly of a towing vehicle is capable of engaging a fifth wheel coupling assembly of a towed vehicle. The fifth wheel hitch may include at least one support frame capable of being secured to the towing vehicle, a cross member secured to the support frame, a pivot beam secured to the cross member, and a skid plate assembly secured to the pivot beam. The skid plate assembly may include a skid plate body, and a skid plate cover engaged with the skid plate body, the skid plate cover having at least one anti-rotation member capable of engaging the skid plate substantially preventing rotation of the skid plate cover relative to the skid plate body.

DESCRIPTION OF THE DRAWINGS

The operation of the invention may be better understood by reference to the following detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
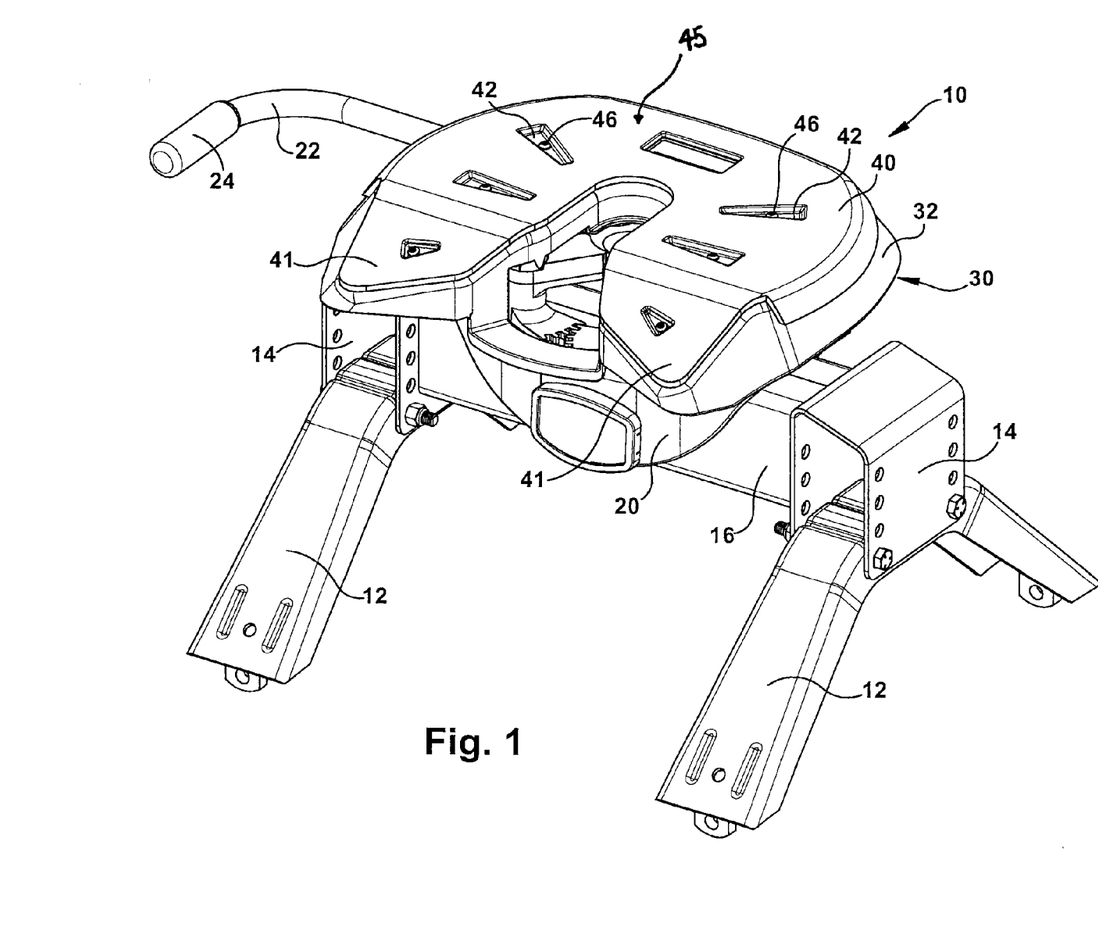
FIG. 1 is a perspective view of a fifth wheel hitch assembly having a skid plate cover.
Figure 3:
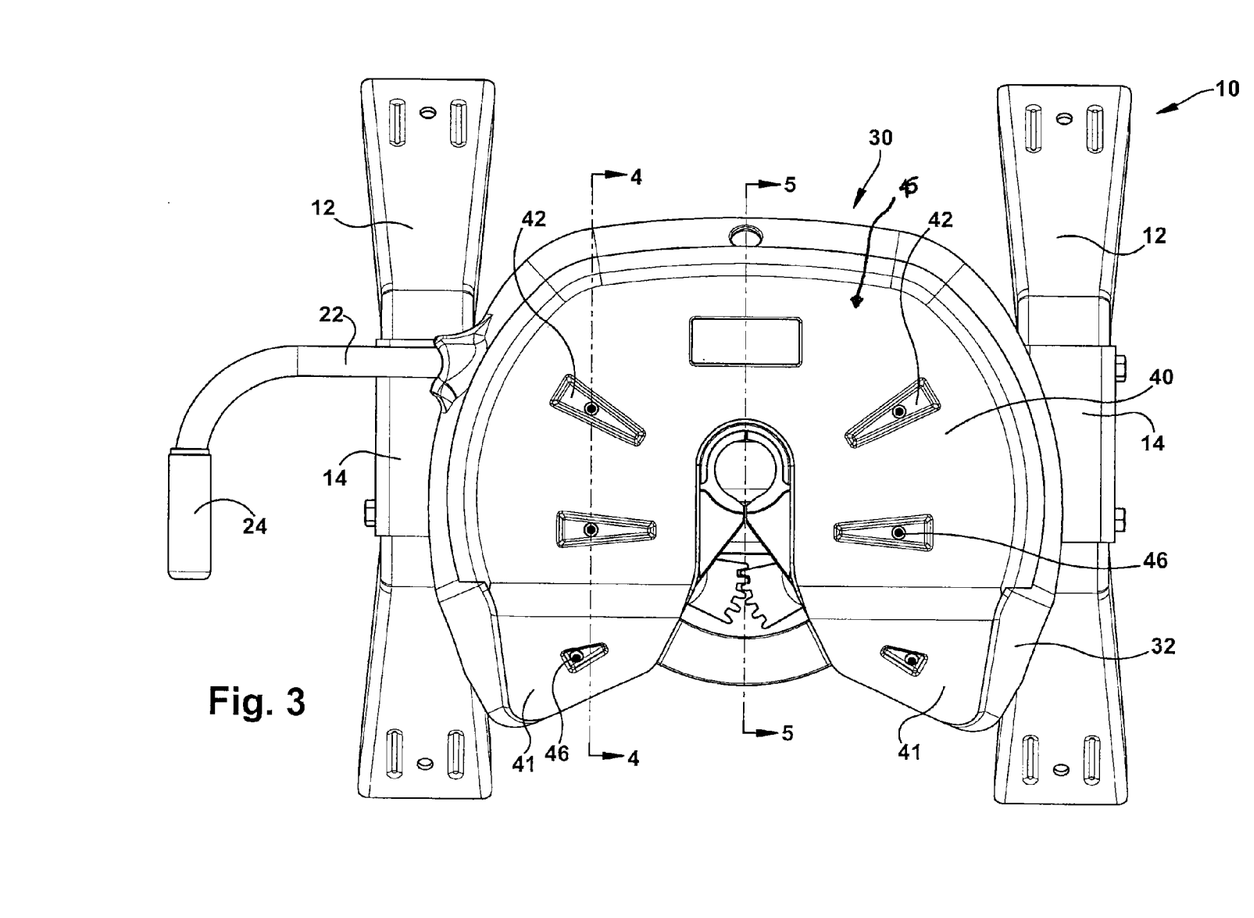
FIG. 3 is a plan view of the skid plate cover in use with the fifth wheel hitch assembly of FIG. 1.

A fifth wheel hitch assembly 10 is illustrated in FIGS. 1 and 3. The fifth wheel hitch assembly 10 may be positioned in a load bed of a towing vehicle, such as a truck (not shown), and secured either to the low bed or directly to the frame of the towing vehicle below the load bed. Once secured to the towing vehicle, a king pin (not shown) of a towed vehicle or trailer may be coupled to the fifth wheel hitch assembly 10. The fifth wheel hitch assembly 10 may be fabricated out of any appropriate types of materials, such as metal or the like.

The fifth wheel hitch assembly 10 may include at least one support frame 12, at least one mounting bracket 14, at least one cross-member 16 and a skid plate assembly 30. By way of a non-limiting example, the fifth wheel hitch assembly 10 may include a pair of support frames 12, although it is not limited to such. The support frames 12 may be of any appropriate shape, size, type or configuration. By way of a non-limiting example, the support frames 12 may be of a generally curved shape, in a substantially arched shaped, or the like.

The support frames 12 may be located at any appropriate position on the fifth wheel hitch assembly 10, such as on each side of the hitch assembly 10. The support frames 12 may be utilized to secure the fifth wheel hitch assembly 10 to the load bed of the towing vehicle. For example, the support frames 12 may be secured to the load bed or the frame of the towing vehicle below the load bed by any appropriate means, such as with fasteners, or the like. More specifically, the support frames 12 may be secured to rails (not shown) that are attached to the frame (not shown) of the towing vehicle below the load bed. In this embodiment, the rails (not shown) may include a plurality of apertures (not shown) below the load bed and the load bed may include correspondingly shaped and positioned apertures (not shown) such that the apertures of the rails may include a fastening device (not shown) such that the support frames 12 may be secured to the fastening device (not shown).

Each support frame 12 may be attached to a mounting bracket 14, whereby the fifth wheel hitch assembly 10 may include a pair of mounting brackets 14. The mounting brackets 14 may be of any appropriate shape, size, type or configuration. By way of a non-limiting example, the mounting brackets 14 may be of a general C-shape or three sided square, rectangular shape, or the like. The mounting brackets 14 may be located at any appropriate position on the fifth wheel hitch assembly 10, such as located above each support frame 12 and adjacent each end of the cross-member 16. The mounting brackets 14 may be utilized to secure the cross-member 16 to the support frames 12.

The cross-member 16 may be of any appropriate shape, size, type or configuration. By way of a non-limiting example, the cross-member 16 may be of a generally square or rectangular tubular shape, or the like. The cross-member 16 may be located at any appropriate position on the fifth wheel hitch assembly 10, such as located between each support frame 12 and mounting bracket 14. The cross-member 16 may be secured to the mounting brackets 14 by any appropriate means, such as by welding, fasteners, or the like. The cross-member 16 may be utilized to secure a pivot beam 20.

Figure 2:
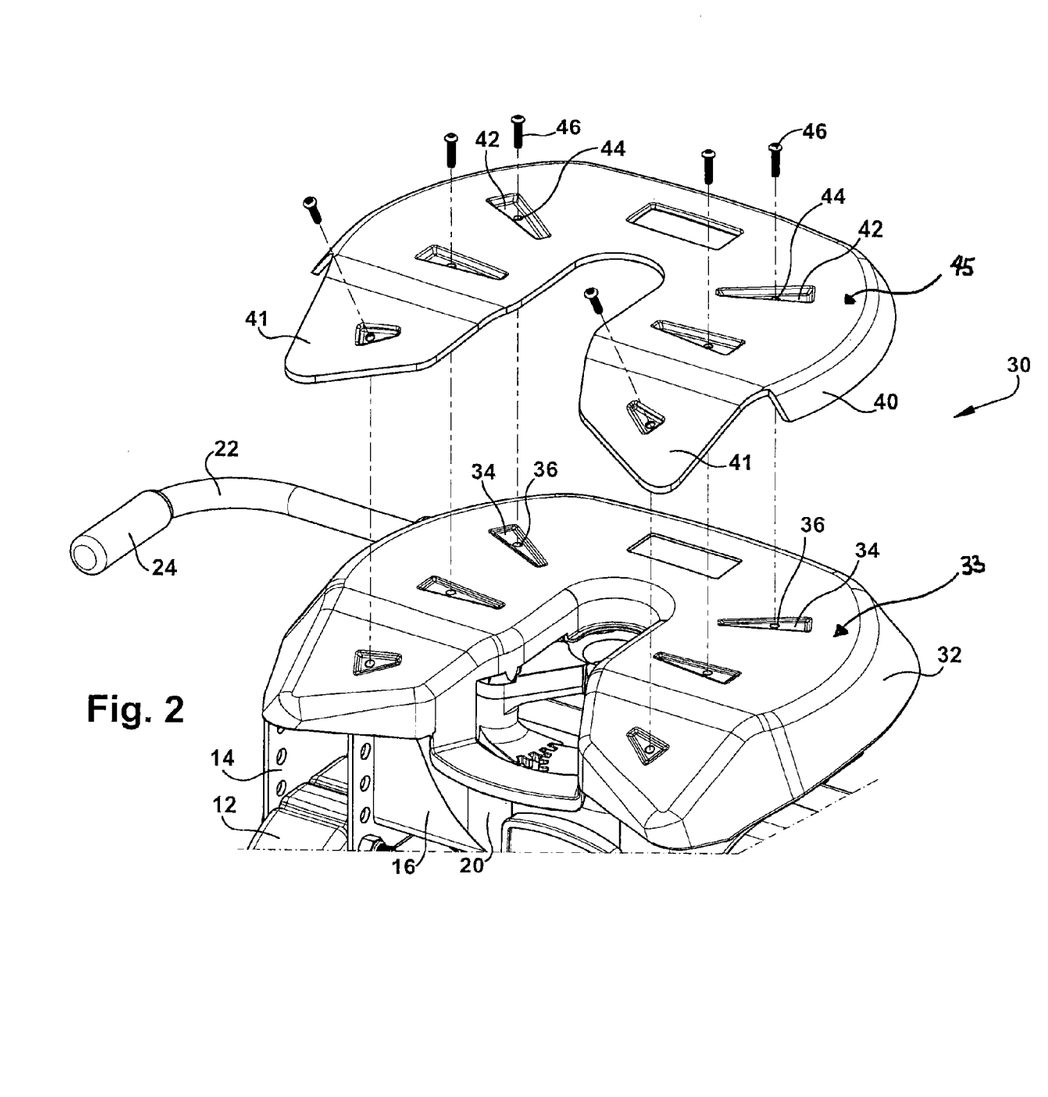
FIG. 2 is a partially exploded perspective view of the skid plate cover of FIG. 1.

The pivot beam 20 may be of any appropriate shape, size, type or configuration. By way of a non-limiting example, the pivot beam 20 may be of a generally curved or cradle shape, a substantially saddled shape, or any other such shape. The pivot beam 20 may be located at any appropriate position on the fifth wheel hitch assembly 10, such as located between each support frame 12 and mounting bracket 14 and adjacent the cross-member 16, an example of which is shown in FIGS. 1-2. The pivot beam 20 may be secured to the cross-member 16 by any appropriate means, such as with fasteners or the like.

The skid plate assembly 30 may include a head or skid plate 32 and a skid plate cover 40. The skid plate 32 may be of any appropriate shape, size, type or configuration. By way of a non-limiting example, the skid plate 32 may be of a general horseshoe shape, a substantially semi-circular shape, a substantially curved shaped or the like. The skid plate 32 may be fabricated out of any appropriate type of materials, such as steel or aluminum.

The skid plate 32 may be located at any appropriate position on the fifth wheel hitch assembly 10, such as located above the pivot beam 20. The skid plate 32 may be utilized to engage with the king pin (not shown) of the trailer/towed vehicle. The pivot beam 20 may be utilized to secure the skid plate 32.

Figure 4:
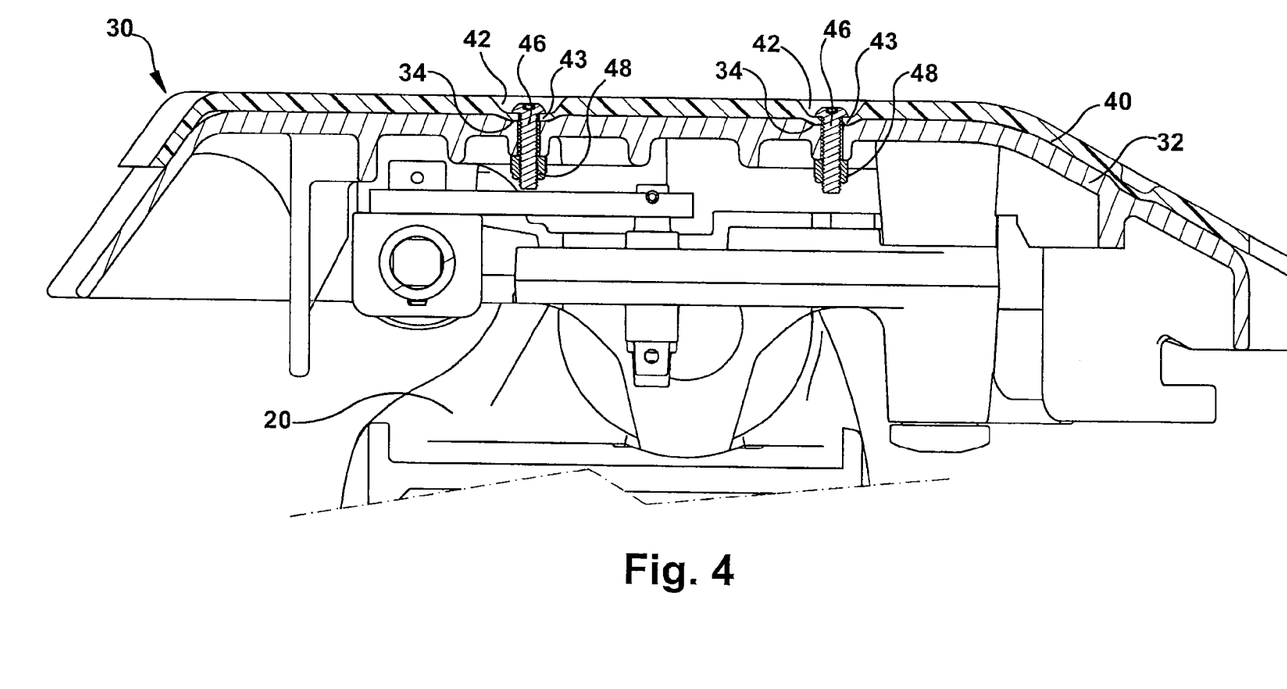
FIG. 4 is a partial cross-sectional view of the skid plate cover in use with the fifth wheel hitch assembly taken along lines 4-4 of FIG. 3.
Figure 5:
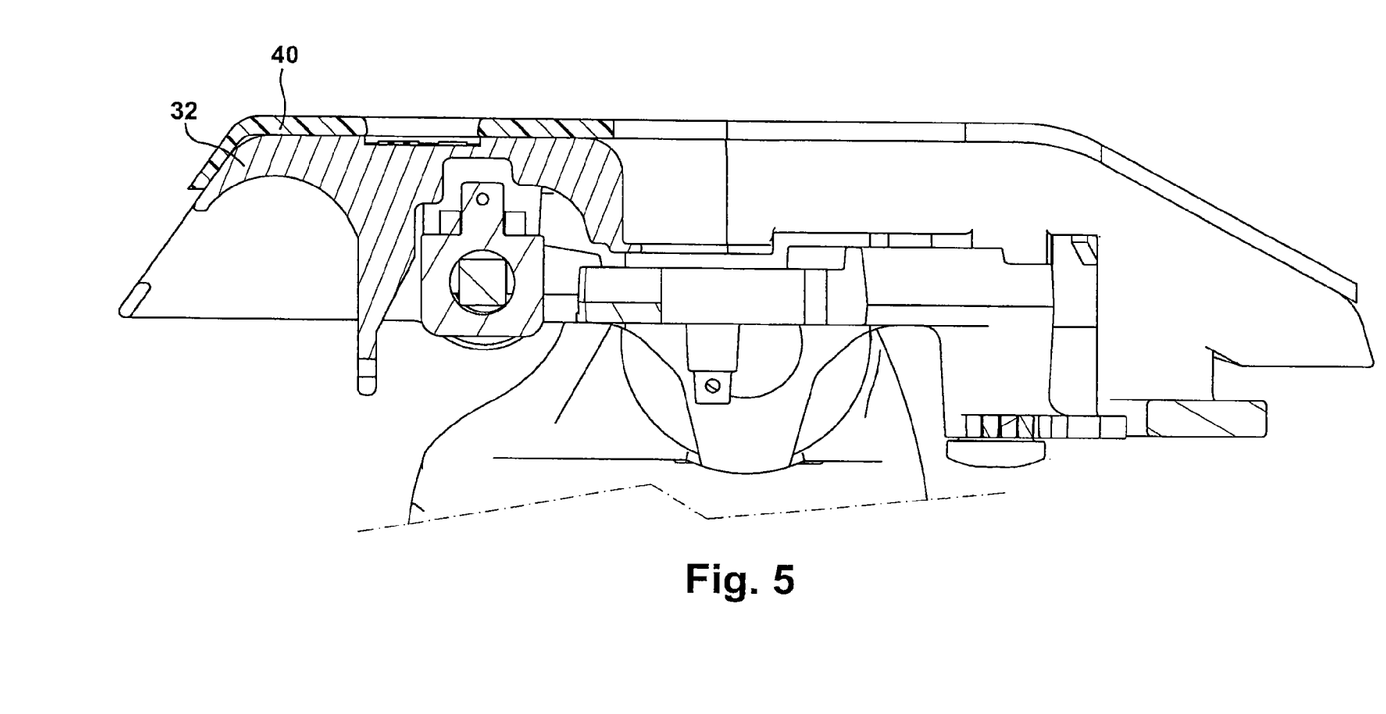
FIG. 5 is a partial cross-sectional view of the skid plate cover in use with the fifth wheel hitch assembly taken along lines 5-5 of FIG. 3.

The skid plate 32 may include at least one recess 34 and at least one aperture 36, an example of which is shown in FIGS. 2 and 4. By way of a non-limiting example, the skid plate 32 may include any appropriate number of recesses 34, such as two, four, five, six, etc, such as for example, the skid plate 32 may include six recesses 34 as shown in FIG. 2.

The recesses 34 may be of any appropriate shape, size, type or configuration, such as a general indentation within a surface 33 of the skid plate 32 shown in FIG. 2. By way of a non-limiting example, the recesses 34 may be of a generally triangular shape, but are not limited to such. The recesses 34 may be located at any appropriate position on the skid plate 32, such as evenly distributed around each side of the horseshoe shaped skid plate 32. By way of a non-limiting example, there may be three recesses 34 located on one side of the skid plate 32 and three recesses 34 located on the other side of the skid plate 32, whereby each side of the skid plate 32 may appear to be a mirror image of the other side. In an alternative embodiment, the recesses 34 may be located at different locations such that each side of the skid plate 32 are not symmetrical.

The apertures 36 may be of any appropriate shape, size, type or configuration, such as a generally circular, oval, square, or rectangular shape or the like. The skid plate 32 may include any appropriate number of apertures 36, such as two, four, five, six, etc. In a non-limiting example, the skid plate 32 may include six apertures 36, which are shown in FIG. 2. In addition, the number of apertures 36 may correspond to the number of recesses 34, but are not limited to such. The apertures 36 may be located at any appropriate position on the skid plate 32, such as located within each recess 34 of the skid plate 32.

The skid plate cover 40 may be of any appropriate shape, size, type or configuration, such a general horseshoe shape, a substantially semi-circular shape, a substantially curved shaped or the like. By way of a non-limiting example, the skid plate cover 40 may be of similar shape to that of the skid plate 32, but is not required to be so. The skid plate cover 40 may be located at any appropriate position on the fifth wheel hitch assembly 10, such as located above the skid plate 32. In use, the skid plate cover 40 may reduce friction and wear between the fifth wheel coupling, such as the king pin (not shown) of the towed vehicle, and the fifth wheel hitch assembly 10 of the towing vehicle.

The skid plate cover 40 may be fabricated in any appropriate manner. By way of a non-limiting example, the skid plate cover 40 may be of a one piece construction that may be molded to the general size and shape of the skid plate 32. This molded construction of the cover 40 may cover up some casting imperfections that may be present in the skid plate 32 and may also reduce the need to machine the skid plate 32 flat or substantially flat.

The skid plate cover 40 may be fabricated out of any appropriate type of materials, such as polymers. By way of a non-limiting example, the skid plate cover 40 may be fabricated out of an ultra-high molecular weight polyethylene (UHMWPE). UHMWPE is a subset of the thermoplastic polyethylene. In the alternative, the skid plate cover 40 may be made from any other tough lubricious plastic or other material that has proven wear life and low friction value. Utilizing UHMWPE for the skid plate cover 40 may allow the skid plate 32 to be cast from a softer material and a potentially more wearable material, such as by way of a non-limiting example aluminum.

The skid plate cover 40 may include a front bend portion 41. The bend portion 41 may be of any appropriate shape or size, such as a generally triangular, rectangular or square shape or the like. The bend portion 41 may be located at any appropriate position on the skid plate cover 40, such as at a front end of the cover 40. By way of a non-limiting example, the bend portion 41 may correspond to a front slanted portion 43 of the skid plate 32 (FIGS. 1 and 2).

The skid plate cover 40 may include at least one cover recess 42 and at least one cover aperture 44. By way of a non-limiting example, the skid plate cover 40 may include any appropriate number of cover recesses 42, such as two, four, five, six, etc., such as the skid plate cover 40 including six cover recesses 42. The skid plate cover 40 may include the same number of cover recesses 42 as skid plate recesses 34.

The cover recesses 42 may be of any appropriate shape, size, type or configuration, such as a general indentation within a surface 45 of the skid plate cover 40. By way of a non-limiting example, the cover recesses 42 may be of a generally triangular, rectangular, or square shape or the like that may be of a corresponding shape to that of the recesses 34 in the skid plate 32. The cover recesses 42 may be located at any appropriate position on the skid plate cover 40, such as being evenly distributed around each side of the horseshoe shaped skid plate cover 40, although it is not limited to such. While the skid plate cover 40 may provide lubrication for the skid plate 32 during use, additional lubrication or grease may still be added to the skid plate 32 and cover 40. By way of a non-limiting example, the cover recesses 42 may hold the grease within the recess 42 for added lubrication.

Figure 6:
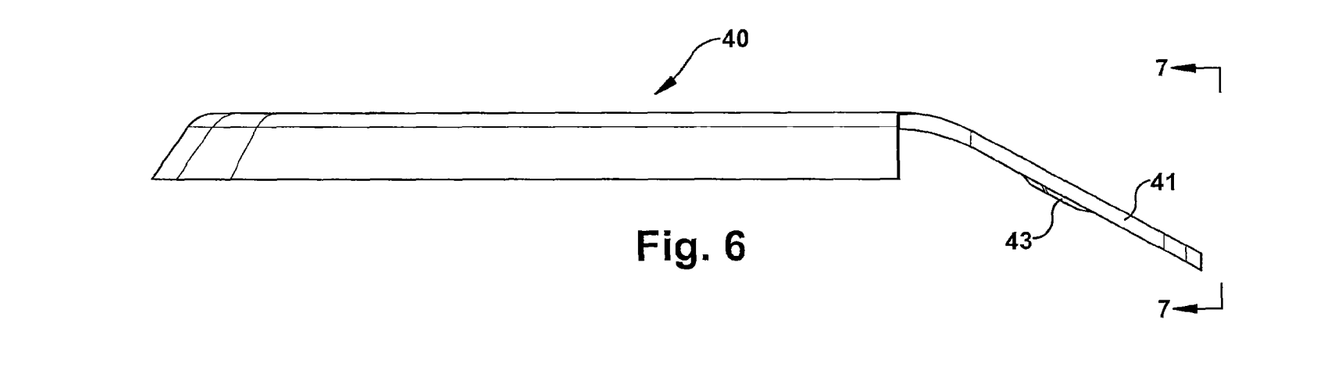
FIG. 6 is an elevation view of the skid plate cover of FIG. 1.
Figure 7:
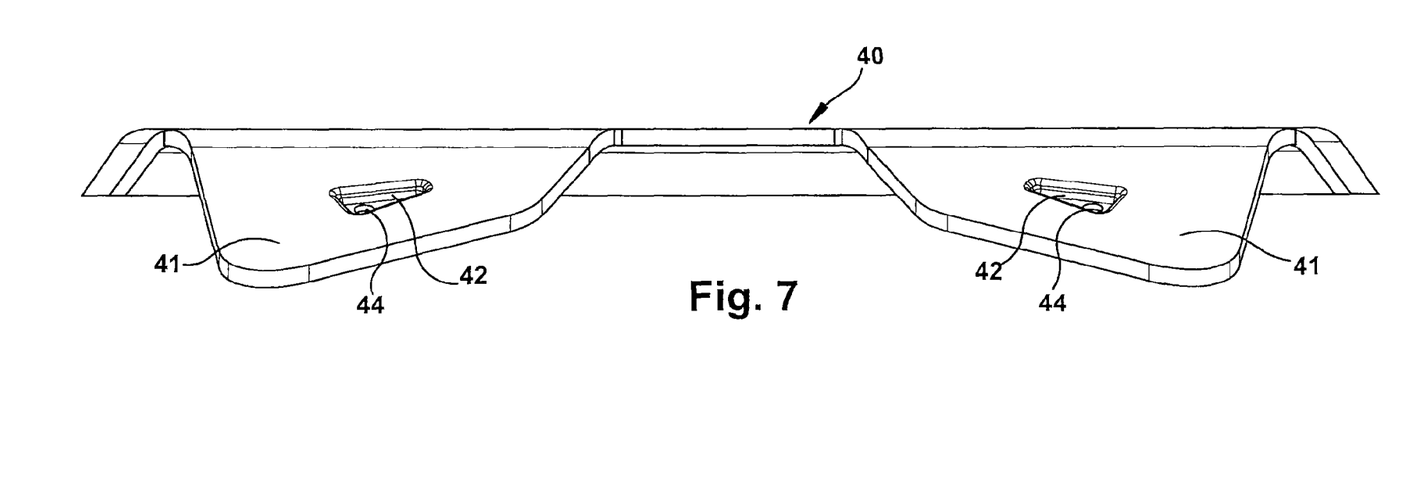
FIG. 7 is a front view of the skid plate cover taken along lines 7-7 of FIG. 6.

Each cover recess 42 may result in a lug element 43 when the cover 40 is viewed from below the surface 45. This lug 43 may protrude outwardly from the cover 40, such as shown in FIGS. 4 and 6. By way of a non-limiting example, each lug 43 may project outward from the cover 40, whereby each lug 43 may then mate with the corresponding recess 34 in the skid plate 32. This engagement of the lug 43 and recess 34 may prevent rotation between the skid plate cover 40 and the skid plate 32.

By way of a non-limiting example, there may be three cover recesses 42 located on one side of the skid plate cover 40 and three cover recesses 42 located on the other side of the skid plate cover 40. This may result in each side of the skid plate cover 40 to appear to be a mirror image of the other side, although it is not required that the sides of the skid plate cover 40 be mirror images of the other. The cover recesses 42 may be located at similar or corresponding locations as the skid plate recesses 34, whereby the two sets of recesses 34, 42 may align with one another.

The cover apertures 44 may be of any appropriate shape, size, type or configuration, such as a generally circular, oval, square or rectangular shape or the like. The skid plate cover 40 may include any appropriate number of cover apertures 44, such as two, four, five, six, etc. By way of a non-limiting example, the skid plate cover 40 may include six cover apertures 44. In addition, the number of cover apertures 44 may correspond to the number of cover recesses 42.

The cover apertures 44 may be located at any appropriate position on the skid plate cover 40, such as located within each cover recesses 42 of the skid plate cover 40. The cover apertures 44 may be located at similar or corresponding locations as the skid plate apertures 36, whereby the two sets of apertures 36, 44 may align with one another.

The skid plate cover 40 may be secured to the skid plate 32 by any appropriate means, such as fasteners, welding or the like. By way of a non-limiting example, fasteners 46, 48 may be used. The fasteners 46, 48 may be of any appropriate shape, size, type or configuration, such as a bolt or screw 46 and a nut 48.

The fasteners 46, 48 may be located at any appropriate position on the skid plate assembly 30, such as adjacent and located through the skid plate apertures 36 and cover apertures 44. By way of a non-limiting example, the fasteners 46 may be located below the surface 45 of the skid plate cover 40 to provide a substantially smooth surface for contact during use of the fifth wheel hitch assembly 10. Securing the skid plate cover 40 to the skid plate 32 by utilizing fasteners 46, 48 may reduce the stress on the skid plate 32 that may otherwise occur during the turning of the fifth wheel hitch assembly 10.

In use, the skid plate 32 and skid plate cover 40 may be aligned and abut one another. The skid plate cover 40 may rely in part on the lugs 43 to mate with the recesses 34 on the skid plate 32. By way of a non-limiting example, the skid plate cover 40 may lock into place via the lugs 43 on the bottom of the cover 40 to the mating surface or recesses 34 on the top of the skid plate 32, which may provide for an anti-rotational feature.

The fifth wheel hitch assembly 10 may further include a handle 22. The handle 22 may be of any appropriate shape, size, type or configuration. By way of a non-limiting example, the handle 22 may be of a general tubular L-shape, a substantially T-shape, or the like. The handle 22 may be located at any appropriate position on the fifth wheel hitch assembly 10, such as located adjacent the isolation system 30 and below the skid plate 32. The handle 22 may be utilized to operate engagement of the skid plate 32 with the king pin (not shown).

The handle 22 may include a grip 24. The grip 24 may be of any appropriate shape, size, type or configuration. By way of a non-limiting example, the grip 24 may be of a general tubular shape similar to that of the handle 22, such as a general tubular L-shape, a substantially T-shape, or the like. The grip 24 may be located at any appropriate position on the handle 22, such as at an end of the handle 22. The grip 24 may provide the user with a comfortable surface to grip the handle 22 when adjusting the fifth wheel hitch assembly 10, as well as being ergonomically shaped to further attempt to ease the use of the handle 22.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A fifth wheel hitch comprising:
    a skid plate with a top periphery and having a plurality of recesses; and
    a skid plate cover secured to said skid plate, said skid plate cover having a periphery substantially matching said top periphery of said skid plate and having a plurality of projections extending below a top surface of said skid plate cover, wherein said projections engage with said recesses.

2. The fifth wheel hitch of claim 1, wherein engagement of said projections and said recesses substantially prevents rotation of said skid plate cover relative to said skid plate.

3. The fifth wheel hitch of claim 1 further comprising a plurality of fasteners securing said skid plate cover to said skid plate, wherein said fasteners are located beneath said top surface of said skid plate cover.

4. The fifth wheel hitch of claim 1, wherein said skid plate cover is fabricated out of polymers.

5. The fifth wheel hitch assembly of claim 1, wherein said skid plate cover provides lubrication to at least one of said skid plate and a coupler assembly of a towed vehicle during engagement of said skid plate with said coupler assembly.

6. The fifth wheel hitch assembly of claim 1, wherein said projections of said skid plate cover are configured to hold lubricant.

7. An assembly for a fifth wheel hitch, said assembly comprising:
    a skid plate;
    a skid plate cover secured with said skid plate; and
    at least one recess having a bottom wall, said recess positioned on a top surface of said skid plate cover, wherein at least a portion of said recess engages said skid plate.

8. The assembly of claim 7, further comprising at least one skid plate recess in a top surface of said skid plate wherein said at least one recess of said skid plate cover engages said at least one skid plate recess in said skid plate below a top surface of said skid plate substantially preventing rotation of said skid plate cover relative to said skid plate.

9. The assembly of claim 8, wherein said at least one recess of said skid plate cover comprises a plurality of recesses formed in said skid plate cover and said at least one skid plate recess of said skid plate comprises a plurality of recesses formed in said skid plate capable of engaging said recesses formed in said skid plate cover.

10. The assembly of claim 9 further comprising a plurality of apertures positioned in said recesses of said skid plate and said skid plate cover.

11. The assembly of claim 10 further comprising a plurality of removable fasteners configured to engage said apertures of said skid plate and skid plate cover securing said skid plate cover to said skid plate.

12. The assembly of claim 7, wherein said skid plate cover provides lubrication to a coupling assembly of a towed vehicle during engagement of said skid plate with said coupling assembly.

13. The fifth wheel hitch of claim 1, wherein the skid plate includes a wall depending from said top periphery and said skid plate cover includes a skirt depending from said skid plate whereby said skirt engages at least a portion of said wall.

14. The fifth wheel hitch of claim 6, wherein said projections are accessible from said top surface of said skid plate cover to hold lubricant.

15. The fifth wheel hitch of claim 1, wherein said plurality of projections include an aperture whereby said fasteners are removably engageable with said apertures.

16. The assembly of claim 7, wherein said skid plate includes a wall depending from said skid plate and said skid plate cover includes a skirt depending from said skid plate whereby said skirt engages at least a portion of said wall.

17. A skid plate cover securable with a skid plate having a periphery, the skid plate cover comprising:
    a top surface having a periphery, wherein said periphery generally matches the periphery of the skid plate; and
    a plurality of recesses positioned in said top surface, wherein said plurality of recesses each include a bottom wall extending below said top surface.

18. The skid plate cover of claim 17, further comprising a skirt depending from said top surface, wherein said skirt is configured to engage at least a portion of the skid plate.

19. The skid plate cover of claim 17, further comprising a plurality of fasteners, wherein said fasteners are removably engageable with said recesses.

20. The skid plate cover of claim 17, wherein said recesses are accessible from said top surface and configured to hold lubricant.

* * * * *